United States Patent
Lin et al.

(10) Patent No.: US 6,877,958 B2
(45) Date of Patent: Apr. 12, 2005

(54) HEAT-DISSIPATING DEVICE AND ITS MANUFACTURING PROCESS

(75) Inventors: Chen-Chang Lin, Taipei (TW); Kuo-Cheng Lin, Taoyuan (TW); Wen-Shi Huang, Taoyuan (TW)

(73) Assignee: Delta Electronics Inc., Taoyuan Hsien (TW)

( * ) Notice: Subject to any disclaimer, the term of this patent is extended or adjusted under 35 U.S.C. 154(b) by 0 days.

(21) Appl. No.: 10/299,842

(22) Filed: Nov. 20, 2002

(65) Prior Publication Data
US 2003/0185681 A1 Oct. 2, 2003

Related U.S. Application Data

(63) Continuation-in-part of application No. 10/172,976, filed on Jun. 18, 2002, now Pat. No. 6,779,992.

(30) Foreign Application Priority Data

Mar. 28, 2002 (TW) .................................... 91203882 U
Jun. 10, 2002 (TW) .................................... 91112474 A

(51) Int. Cl.$^7$ ................................................ F04D 5/02
(52) U.S. Cl. ................... 416/228; 416/234; 416/243
(58) Field of Search .................. 416/95, 234, 223 R, 416/243, 228

(56) References Cited

U.S. PATENT DOCUMENTS

| | | | | | |
|---|---|---|---|---|---|
| 5,290,149 | A | * | 3/1994 | Vieth | 416/188 |
| 6,318,964 | B1 | * | 11/2001 | Yang | 416/185 |
| 6,386,276 | B1 | * | 5/2002 | Chen et al. | 165/121 |
| 6,572,336 | B2 | * | 6/2003 | Horng et al. | 416/183 |
| 6,623,265 | B1 | * | 9/2003 | Day | 425/438 |

FOREIGN PATENT DOCUMENTS

| | | | | | |
|---|---|---|---|---|---|
| FR | 2583826 | A1 | * | 12/1986 | F04D/29/32 |
| TW | 413273 | | | 8/1988 | |

* cited by examiner

Primary Examiner—Ninh H. Nguyen
(74) Attorney, Agent, or Firm—Birch, Stewart, Kolasch, & Birch, LLP

(57) ABSTRACT

A heat-dissipating device and its manufacturing process are provided for significantly increasing the number and size of blades so as to enhance the heat-dissipating performance. The heat-dissipating device has a plurality of blades arranged around the hub of the heat-dissipating device and there is an overlapped region formed between every two adjacent blades. A single mold is used to manufacture such a heat-dissipating device so that not only can the manufacturing cost be reduced but it can significantly increase the number and size of blades so as to increase the heat-dissipating efficiency.

6 Claims, 5 Drawing Sheets

HEAT-DISSIPATING DEVICE AND ITS MANUFACTURING PROCESS

This application is a continuation-in-part of application Ser. No. 10/172,976, filed on Jun. 18, 2002 Now U.S. Pat. No. 6,779,992, for which priority is claimed under 35 U.S.C. §120. This application also claims priority under 35 U.S.C. §119(a) on Patent Application No(s). 091203882, filed in Taiwan, R.O.C. on Mar. 28, 2002, and 091112474, filed in Taiwan, R.O.C. on Jun. 10, 2002, the entire contents of which are hereby incorporated by reference.

FIELD OF THE INVENTION

The present invention is related to a heat-dissipating device and its manufacturing process, and especially to a heat-dissipating device having a plurality of blades and there is an overlapped region formed between every two adjacent blades for enhancing the heat-dissipating performance.

BACKGROUND OF THE INVENTION

Generally, in order to prevent the electronic device from being contaminated by particle or dust in the atmosphere, the electronic device is usually disposed in a closed housing. However, the electronic device will generate a lot of heat during the operating process. If the electronic device is continuously placed in a high-temperature state, it will easily cause a damage on the electronic device and shorten its useful life. Thus, in order to prevent the malfunction of the electronic device, a heat-dissipating fan is usually used to dissipate the heat generated by the electronic device from inside to external environment.

Please refer to FIG. 1A which is a top view of a traditional fan. This fan includes a hub 11 and a plurality of blades 12 arranged around the hub but each blade does not overlap with the other. The mold used for manufacturing such a fan is composed of a male mold 13 and a female mold 14 and the separating line between the male mold and the female mold is indicated by an imaginary line 15 shown in FIG. 1B. When stripping the mold, the male mold 13 and the female mold 14 are separated from each other along the upward and downward directions, respectively, indicated by the arrows shown in FIG. 1B to complete the manufacturing process.

At the present time, a commonly used way for increasing the airflow discharged from the fan so as to enhance the heat-dissipating efficiency is to enlarge the size of blades of the fan or increase the number of blades. However, under the design limitation of mold used for manufacturing the fan, the size or number of blades of the fan can not be effectively increased to improve the heat-dissipating performance of the fan.

With the improvement of technology, one way is to allow two blades to be disposed closely as possible so as to slightly increase the discharged airflow. However, this way will let the mold have an acute notch as an edge on a knife, which may be vulnerable or easily damaged.

Therefore, it is desirable to provide a heat-dissipating device which can greatly enhance the heat-dissipating efficiency.

SUMMARY OF THE INVENTION

An object of the present invention is to provide a heat-dissipating fan and its manufacturing process for significantly increasing the number and size of blades so as to enhance the heat-dissipating performance. The heat-dissipating device has a plurality of blades arranged around the hub of the heat-dissipating device and there is an overlapped region formed between every two adjacent blades.

Another object of the present invention is to provide a heat-dissipating device having an overlapped region formed between every two adjacent blades thereof and manufactured by a single mold, which not only can reduce the manufacturing cost but can significantly increase the number and size of blades so as to increase the heat-dissipating efficiency.

Preferably, the hub and said plurality of blades are integrally formed by injection molding.

Preferably, each of said plurality of blades has one selected from a group essentially consisting of inclined plate, triangle, trapezoid, curved, arcuate and wing structures.

According to one aspect of the present invention, the process for manufacturing a heat-dissipating fan includes the steps of providing a mold including a first mold portion and a second mold portion, wherein a separating line between said first mold portion and said second mold portion is positioned corresponding to the largest cross section of each blade of said heat-dissipating device; applying a used material into a space defined in said mold for forming said heat-dissipating device therein so as to execute a forming step of said heat-dissipating device; and stripping said first mold portion and said second mold portion along an inclined direction of blades, thereby fabricating said heat-dissipating device.

Preferably, said used material is one selected from a group consisting of an iron-containing material, metal and plastic. The first mold portion and said second mold portion are separated from each other through a toothed gearing mode during said stripping step.

The present invention may best be understood through the following description with reference to the accompanying drawings, in which:

DETAILED DESCRIPTION OF THE PREFERRED EMBODIMENT

The present invention will now be described more detailedly with reference to the following embodiments. It is to be noted that the following descriptions of the preferred embodiments of this invention are presented herein for the purpose of illustration and description only. It is not intended to be exhaustive or to be limited to the precise form disclosed.

Please refer to FIGS. 2A~2E which are schematic diagrams showing a preferred embodiment of the process for manufacturing a heat-dissipating device of the present invention. The heat-dissipating device is composed of a cup-shaped body (or called "hub") 23 and a plurality of blades 24 arranged around the hub. There is an overlapped region formed between every two adjacent blades, that is, the region indicated by imaginary lines shown in FIG. 2E, to serve as an airflow guiding route. The manufacturing process is described in detail as follow.

Figure 1A:
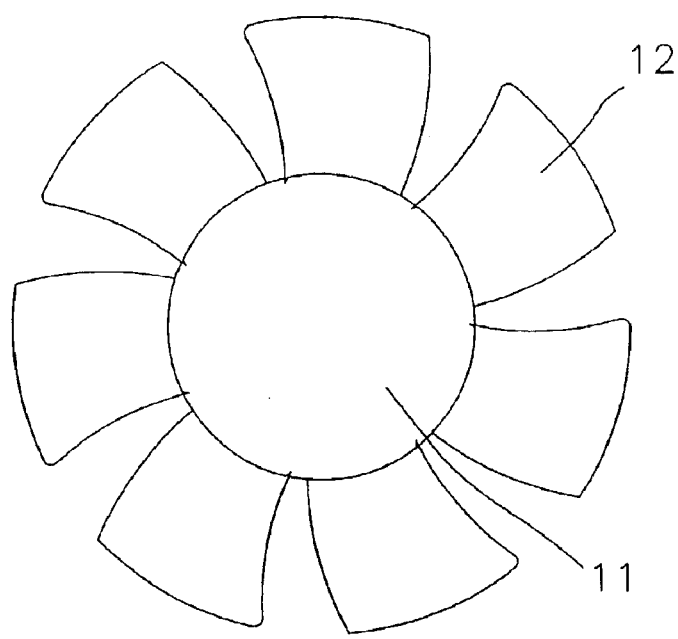
FIG. 1A is a top view of a conventional fan.
Figure 1B:
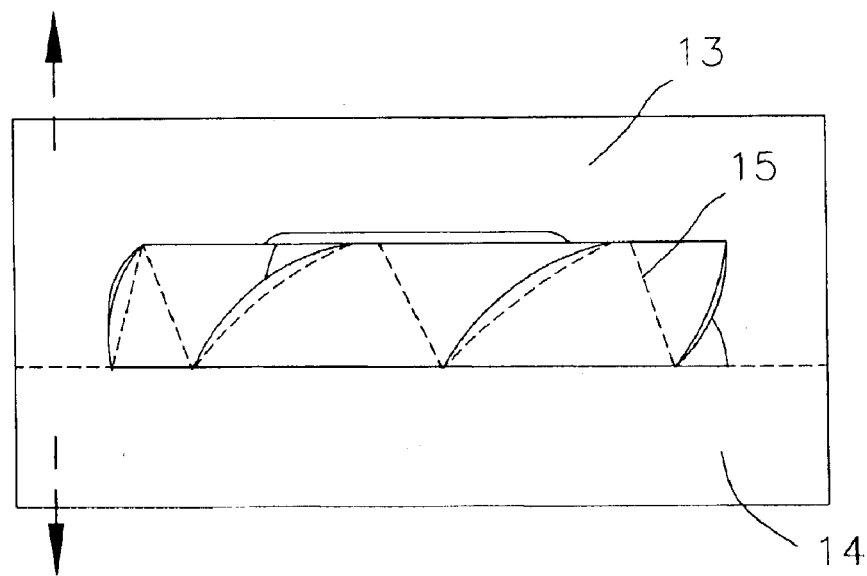
FIG. 1B is a schematic diagram showing how to separate the male and female molds used for manufacturing the conventional fan of FIG. 1A.
Figure 2A:
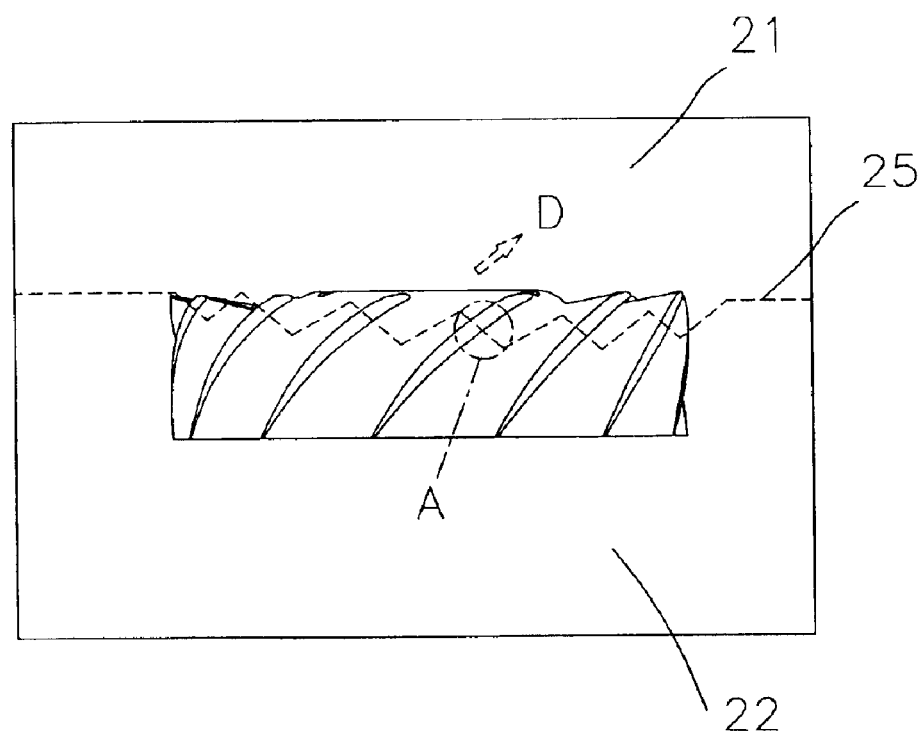
FIG. 2A is a schematic diagram showing how to separate the male and female molds used for manufacturing a preferred embodiment of the heat-dissipating device according to the present invention.

First of all, a mold is provided for manufacturing the heat-dissipating device. The mold includes a first mold portion 21 and a second mold portion 22 as shown in FIG. 2A. The separating line 25 between the first mold portion 21 and the second mold portion 22 is positioned corresponding to the largest cross section of each blade of the heat-dissipating device to prevent the blades of the fabricated product from being damaged when stripping the mold.

Then, a used or desired material is applied into a space defining in the mold for forming the heat-dissipating device therein so as to execute a forming step of the heat-dissipating device, for example, a heating or pressing step. Generally, the used material can be an iron-containing material, metal, plastic, etc.

Figure 2B:
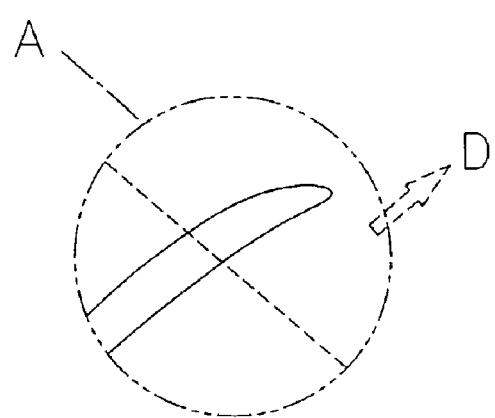
FIG. 2B is a partially amplified diagram of the circular part A shown in FIG. 2A.
Figure 2C:
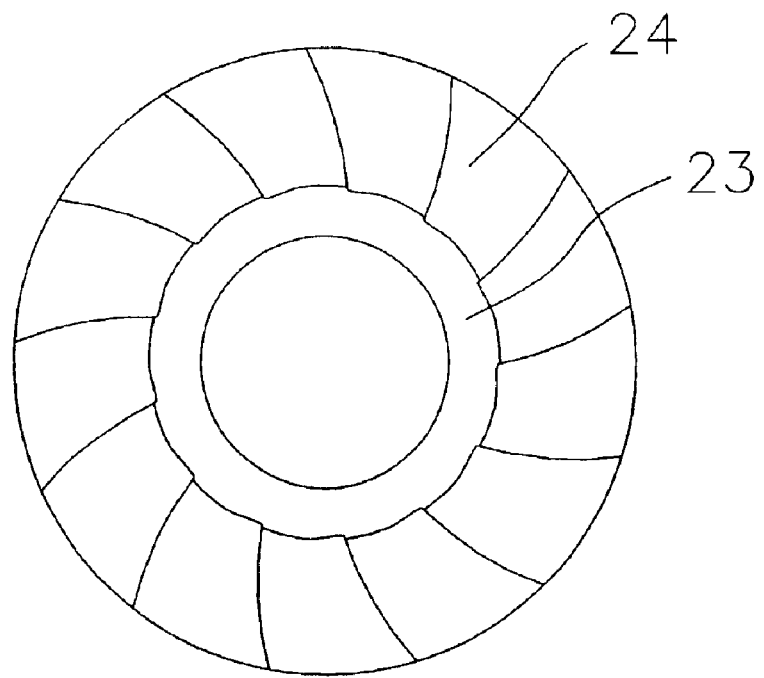
FIG. 2C is a top view of the heat-dissipating device manufactured by the method shown in FIG. 2A.
Figure 2D:
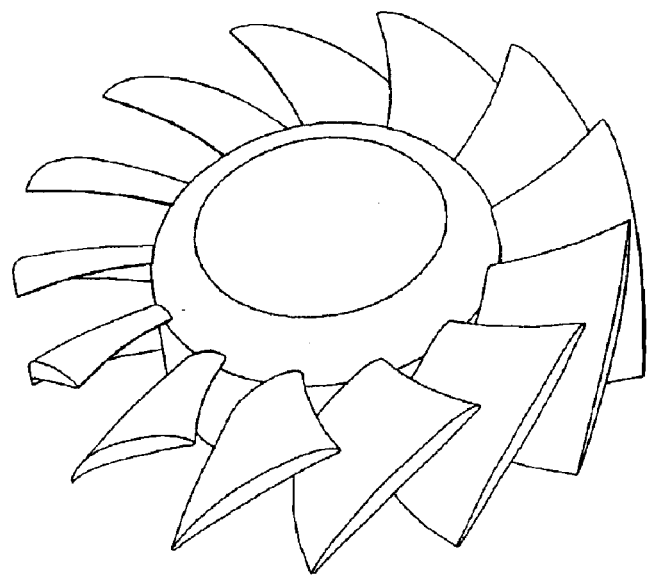
FIG. 2D is a perspective view of the heat-dissipating device of FIG. 2C.
Figure 2E:
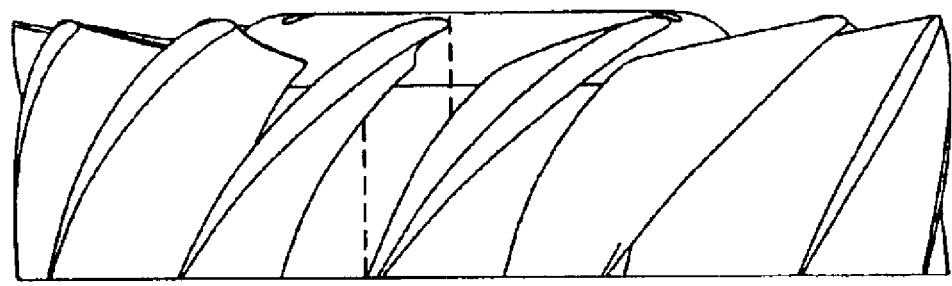
FIG. 2E is a side view of the heat-dissipating device of FIG. 2D.

During the stripping step, the first mold portion and the second mold portion are separated from each other along an inclined direction of blades of the heat-dissipating device through a toothed gearing mode, as the direction D shown in FIG. 2A or 2B. From the top view, the fabricated heat-dissipating device has an appearance as shown in FIG. 2C due to the formation of the overlapped region.

Figure 3A:
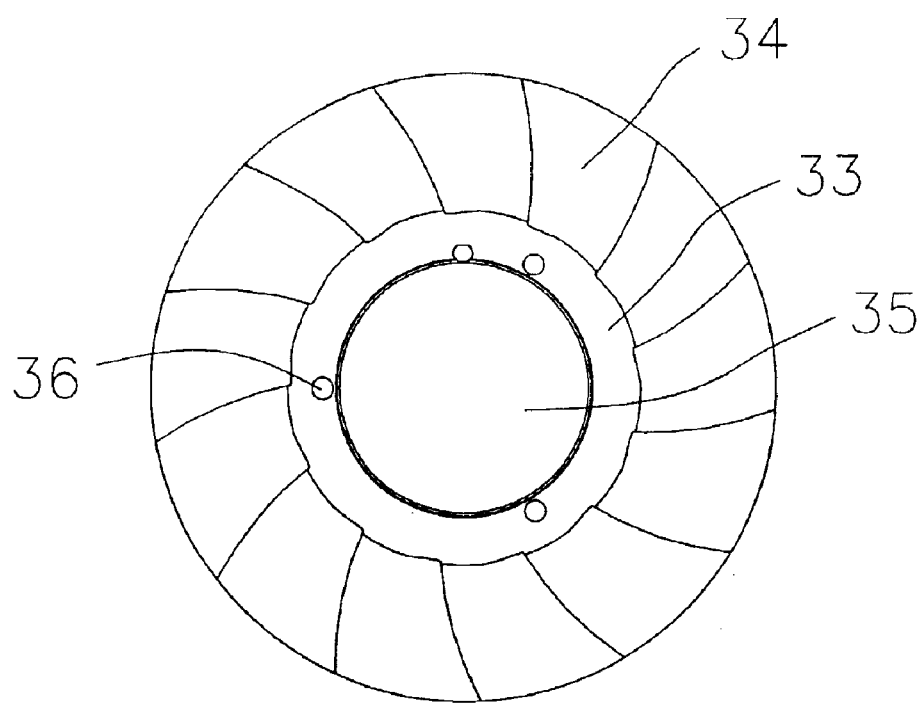
FIG. 3A is a top view of another preferred embodiment of the heat-dissipating device of the present invention.
Figure 3B:
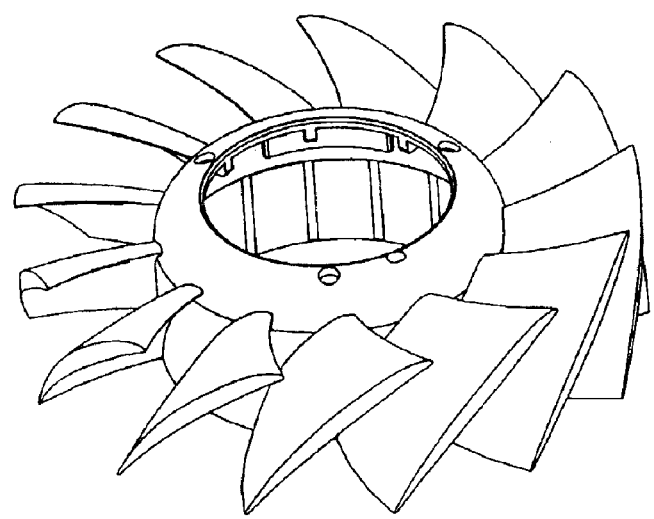
FIG. 3B is a perspective view of the heat-dissipating device of FIG. 3A.

In addition, referring to FIGS. 3A and 3B which show another preferred embodiment of the heat-dissipating device of the present invention. Its manufacturing process is similar to that of the above-mentioned embodiment. The difference is that the hub 33 of the fabricated heat-dissipating device has a central opening 35 and a plurality of heat-dissipating holes 36 are formed on the periphery of the central opening 35 to further dissipate the heat generated from the required device mounted under the hub such as a motor when the heat-dissipating device is driven by motor to rotate.

In above-described embodiments, each blade has the appearance like an inclined plate, triangle, trapezoid, curved, arcuate or wing structure, and has a wing-liked cross-section.

Consequently, in the present invention, the plurality of blades are arranged around the hub of the heat-dissipating device and there is an overlapped region formed between every two adjacent blades, Moreover, the heat-dissipating device is manufactured by a single mold, which not only can reduce the manufacturing cost but can significantly increase the number and size of blades so as to increase the heat-dissipating efficiency and performance While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A heat-dissipating device comprising a body and a plurality of blades with a wing-liked cross-section and arranged around said body, wherein said body and said blades are integrally formed as a single unit, and there is an overlapped region formed between every two adjacent blades.

2. The heat-dissipating device according to claim 1 wherein said body has a cup-shaped hub.

3. The heat-dissipating device according to claim 2 wherein said body has a central opening.

4. The heat-dissipating device according to claim 3 wherein said body further includes a plurality of heat-dissipating holes formed around said central opening.

5. The heat-dissipating device according to claim 3 wherein said body and said plurality of blades are integrally formed by injection molding.

6. A heat-dissipating device comprising a body and a plurality of blades arranged around said body, wherein said body and said blades are integrally formed as a single unit, and there is an overlapped region formed between every two adjacent blades, and each of said plurality of blades has a curved upper edge thereof.

* * * * *